US012325322B2

(12) United States Patent
Northrop et al.

(10) Patent No.: US 12,325,322 B2
(45) Date of Patent: Jun. 10, 2025

(54) PHYSICAL MODEL-GUIDED MACHINE LEARNING FRAMEWORK FOR ENERGY MANAGEMENT OF VEHICLES

(71) Applicant: Regents of the University of Minnesota, Minneapolis, MN (US)

(72) Inventors: William Northrop, Minneapolis, MN (US); Andrew Kotz, Minneapolis, MN (US); PengYue Wang, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 1430 days.

(21) Appl. No.: 16/597,441

(22) Filed: Oct. 9, 2019

(65) Prior Publication Data

US 2020/0108732 A1 Apr. 9, 2020

Related U.S. Application Data

(60) Provisional application No. 62/743,321, filed on Oct. 9, 2018.

(51) Int. Cl.
| | |
|---|---|
| *B60L 58/00* | (2019.01) |
| *B60L 50/60* | (2019.01) |
| *B60L 58/12* | (2019.01) |
| *G06N 3/00* | (2023.01) |
| *G06N 3/04* | (2023.01) |
| *G06N 3/08* | (2023.01) |

(52) U.S. Cl.
CPC ............. *B60L 58/12* (2019.02); *B60L 50/60* (2019.02); *G06N 3/04* (2013.01); *G06N 3/08* (2013.01); *B60L 2240/60* (2013.01)

(58) Field of Classification Search
CPC ...... B60L 58/12; B60L 50/60; B60L 2240/60; G06N 3/04; G06N 3/08
USPC .......................................................... 701/22
See application file for complete search history.

(56) References Cited

U.S. PATENT DOCUMENTS

| | | | | |
|---|---|---|---|---|
| 2005/0228553 | A1* | 10/2005 | Tryon ..................... | B60L 50/16 701/22 |
| 2012/0290159 | A1* | 11/2012 | McGee ................. | B60W 10/26 903/903 |
| 2016/0200314 | A1* | 7/2016 | Tagami ................. | B60W 10/06 180/65.265 |

(Continued)

OTHER PUBLICATIONS

Rajagopalan et al., Intelligent Control of Hybrid Electric Vehicles Using GPS Information, SAE Technical Paper, No. 724, 11 pages, 2002.

(Continued)

*Primary Examiner* — Tiffany P Young
(74) *Attorney, Agent, or Firm* — Theodore M. Magee; Westman, Champlin & Koehler, P.A.

(57) ABSTRACT

A method of determining when to increase an amount electrical energy available to a vehicle includes setting a parameter for a function describing a reference state of charge as a function of distance traveled, wherein the reference state of charge represents a state of charge of the vehicle at which the amount of electrical energy available to the vehicle should be increased. For each trip of the vehicle, the parameter for the function is modified so that different trips of a same vehicle use different functions for the reference state of charge.

22 Claims, 12 Drawing Sheets

(56) References Cited

U.S. PATENT DOCUMENTS

2016/0355172 A1* 12/2016 Park ............... B60W 20/10

OTHER PUBLICATIONS

Ripaccioli et al., A stochastic model predictive control approach for series hybrid electric vehicle power management, in Proceeding American Control Conference (ACC), pp. 5844-5849, 2010.
Rousseau et al., Plug-in hybrid electric vehicle control strategy parameter optimization, presented at the Electric Vehical Symp.-23, 14 pages, 2007.
Rowland et al., An analysis of categorical distributional reinforcement learning, Proceedings of the 21st Conference on Artificial Intelligence and Statistics (AISTATS), 9 pages, 2018.
Salmasi, Control Strategies for Hybrid Electric Vehicles: Evolution, Classification, Comparison, Fol. 56, No. 5, pp. 2393-2404, 2007.
Serrao et al., A Comparative Analysis of Energy Management Strategies for Hybrid Electric Vehicles, Journal of Dynamic Systems, Measurement, and Control, vol. 133, No. 3, pp. 031012-1-031012-9, 2011.
Sharer et al., Plug-in hybrid electric vehicle control strategy: Comparison between EV and charge-depleting options, SAE International, Paper No. 2008-01-0460, 2008.
Shekhar et al., Encyclopedia of GIS. Springer Publishing Company, 36 pages, 2007.
Silver et al., Deterministic policy gradient algorithms, Proceedings of the 31st International Conference on Machine Learning, vol. 32. pp. 387-395, 2014.
Stockar et al., Energy-Optimal Control of Plug-in Hybrid Electric Vehicles for Real-World Driving Cycles, IEEE Transactions on Vehicular Technology, vol. 60, No. 7, pp. 2949-2962, 2011.
Sun et al., Dynamic Traffic Feedback Data Enabled Energy Management in Plug-in Hybrid Electric Vehicles, IEEE Transactions on Control Systems Technology, vol. 23, No. 3, pp. 1075-1086, 2015.
Taherzadeh et al., A New Efficient Fuel Optimization in Blended Charge Depletion/Charge Sustenance Control Strategy for Plug-In Hybrid Electric Vehicles, IEEE Transactions on Intelligent Vehicles, vol. 3, No. 3, pp. 374-383, 2018.
Tian et al., Adaptive Fuzzy Logic Energy Management Strategy Based on Reasonable SOC Reference Curve for Online Control of Plug-in Hybrid Electric City Bus, IEEE Transactions on Intelligent Transportation Systems, vol. 19, No. 5, pp. 1607-1617, 2018.
Tianheng et al., A Supervisory Control Strategy for Plug-In Hybrid Electric Vehicles Based on Energy Demand Prediction and Route Preview, IEEE Transactions on Vehicular Technology, vol. 64, No. 5, pp. 1691-1700, 2015.
Tulpule et al., Effects of different PHEV control strategies on vehicle performance, Proceedings of the American Control Conference, pp. 3950-3955, 2009.
Unal et al., Quantification of highway vehicle emissions hot spots based upon on-board measurements., Journal of the Air and Waste Management Association, vol. 54, No. 2, pp. 130-140, 2004.
Vinitsky et al., Lagrangian Control through Deep-RL: Applications to Bottleneck Decongestion, 21st International Conference on Intelligent Transportation Systems (ITSC), pp. 759-765, 2018.
Wang et al., Adaptive RBF network for parameter estimation and stable air-fuel ratio control, Neural Networks, vol. 21, No. 1, pp. 102-112, 2008.
Wang et al., Deep Reinforcement Learning with Knowledge Transfer for Online Rides Order Dispatching, IEEE International Conference on Data Mining (ICDM), pp. 617-626, 2018.
Wang et al., A Deep Reinforcement Learning Framework for Energy Management of Range-Extended Hybrid Electric Delivery Vehicles, IEEE Intelligent Vehicles Symposium, pp. 1837-1842, 2019.
Wirasingha et al., Classification and Review of Control Strategies for Plug-In Hybrid Electric Vehicles, IEEE Transactions on Vehicular Technology, vol. 60, No. 1, pp. 111-122, 2011.
Wu et al., Development and Evaluation of an Intelligent Energy-Management Strategy for Plug-in Hybrid Electric Vehicles, IEEE Transactions on Intelligent Transportation Systems, vol. 15, No. 3, pp. 1091-1100, 2014.
Xie et al., Transdisciplinary Foundations of Geospatial Data Science, International Journal of Geo-Information, ISPRS, vol. 6, No. 12, 24 pages, 2017.
Xie et al., Time-Efficient Stochastic Model Predictive Energy Management for a Plug-In Hybrid Electric Bus with Adaptive Reference State-of-Charge Advisory, IEEE Transactions on Vehicular Technology, vol. 67, No. 7, pp. 5671-5682, 2018.
Yoo et al., System Integration and Power-Flow Management for a Series Hybrid Electric Vehicle Using Supercapacitors and Batteries, IEEE Transactions on Industry Applications, vol. 44, No. 1, pp. 108-114, 2008.
Zeng et al., A Parallel Hybrid Electric Vehicle Energy Management Strategy Using Stochastic Model Predictive Control With Road Grade Preview, IEEE Transactions on Control Systems Technology, vol. 23, No. 6, pp. 2416-2423, 2015.
Zeng et al., Optimizing the Energy Management Strategy for Plug-In Hybrid Electric Vehicles With Multiple Frequent Routes, IEEE Transactions on Control Systems Technology, vol. 27, No. 1, pp. 394-400, 2017.
Zhang et al., Role of Terrain Preview in Energy Management of Hybrid Electric Vehicles, IEEE Transactions on Vehicular Technology, vol. 59, No. 3, pp. 1139-1147, 2010.
Zhang et al., Real-Time Energy Management Strategy Based on Velocity Forecasts Using V2V and V2I Communications, IEEE Transactions on Intelligent Transportation Systems, vol. 18, No. 2, pp. 416-430, 2017.
Zhang et al., Predictive Energy Management Strategy for Fully Electric Vehicles Based on Preceding Vehicle Movement, IEEE Transactions on Intelligent Transportation Systems, vol. 18, No. 11, pp. 3049-3060, 2017.
Ali et al., Discovering Non-compliant Window Co-Occurance Patterns: A Summary of Results, Advances in Spatial and Temporal Databases, pp. 391-410, 2015.
Ali et al., Future Connected Vehicles: Challenges and Opportunities for Spatio-temporal Computing, ACM Int. Conf. Adv. Geogr. Inf. Syst., Article No. 14, pp. 20-23, 2015.
Ali et al., Emerging Applications of Spatial Network Big Data in Transportation, Big Data and Computational Intelligence in Networking, Chapter 18, pp. 433-540, 2017.
Ambuhl et al., Predictive reference signal generator for hybrid electric vehicles, IEEE Transactions of Vehicular Technology, vol. 58, No. 9, pp. 4730-4740, 2009.
Badshah et al., Particle Emissions from Light-Duty Vehicles during Cold-Cold Start, SAE International Journal of Engines, vol. 9, No. 3, 2016.
Bellemare et al., A distributional perspective on reinforcement learning. In Proceedings of the 34th International Conference on Machine Learning (ICML), 19 pages, 2017.
Bevly et al., Integrating INS Sensors with GPS Velocity Measurements for Continuous Estimation of Vehicle Sideslip and Tire Cornering Stiffness, in Proceedings of the American Control Conference, vol. 27, No. 6, pp. 25-30, 2001.
Bojarski et al., End to end learning for self-driving cars, IEEE Computer Society Conference on Computer Vision and Pattern Recognition (CVPR), 9 pages, 2016.
Brahma et al., Optimal energy management in series hybrid electric vehicles, Proceedings of the American Control Conference, vol. 1, pp. 60-64, 2000.
Chen et al., Temporal-Difference Learning-Based Stochastic Energy Management for Plug-in Hybrid Electric Buses, in IEEE Transactions on Intelligent Transportation Systems, vol. 20, No. 6, pp. 2378-2388, 2019.
Dabney et al., Implicit quantile networks for distributional reinforcement learning, Proceedings of the 35th International Conference on Machine Learning, 14 pages, 2018.
Daily et al., The use of GPS for vehicle stability control systems, IEEE Transactions on Industrial Electronics, vol. 51, No. 2, pp. 270-277, 2004.

(56) References Cited

OTHER PUBLICATIONS

Davenport et al. Big Data in Big Companies, International Institute for Analytics, pp. 1-31, 2013.
Denis et al., Power Split Strategy Optimization of a Plug-in Parallel Hybrid Electric Vehicle, IEEE Transactions on Vehicular Technology, vol. 67, No. 1, pp. 315-326, 2018.
Di Cairano et al., Stochastic MPC With Learning for Driver-Predictive Vehicle Control and its Application to HEV Energy Management, IEEE Transactions on Control Systems Technology, vol. 22, No. 3, pp. 1018-1031, 2014.
Freyermuth et al., Comparison of Powertrain Configuration for Plug-in HEVs from a Fuel Economy Perspective, SAE International Journal of Engines, vol. 1, No. 1, pp. 392-398, 2008.
Fridholm et al., Robustness Comparison of Battery State of Charge Observers for Automotive Applications. Proceedings of the 19th World Congress IFAC, pp. 2138-2146, 2014.
Fridholm et al., Robust recursive impedance estimation for automotive lithium-ion batteries. Journal of Power Sources, vol. 304, 33-41, 2016.
Fridholm et al., Estimating power capability of aged lithium-ion batteries in presence of communication delays, Journal of Power Sources, No. 383, 24-33, 2018.
Gonder et al. Measuring and Reporting Fuel Economy of Plug-In Hybrid Electric Vehicles, National Renewable Energy aboratory, 15 pages, 2006.
Gouge et al., The spatial distribution of diesel transit bus emissions and people: implications of scale on exposure and impact assessment, Environmental Science Technology, vol. 44, No. 18, pp. 7163-7168, 2010.
Gunturi et al., Lagrangian Xgraphs: A Logical Data-Model for Spatio-Temporal Network Data: A Summary, Adv. Concept. Model., vol. 8823, pp. 201-211, 2014.
Haghani et al., A dynamic vehicle routing problem with time-dependent travel times, Computers and Operations Research, vol. 32, No. 11, pp. 2959-2986, 2005.
Hahn et al., GPS-based real-time identification of tireroad friction coefficient, IEEE Transactions on Control Systems Technology, vol. 10, No. 3, pp. 331-343, 2002.
Huang et al., Parameter optimization of power control strategy for series hybrid electric vehicle, in Proc. IEEE CEC, pp. 1989-1994, 2006.
Hubaux et al., The security and privacy of smart vehicles, IEEE Security and Privacy Mag., vol. 2, No. 3, pp. 49-55, 2004.
Johannesson et al., Assessing the Potential of Predictive Control for Hybrid Vehicle Powertrains Using Stochastic Dynamic Programming, IEEE Transactions on Intelligent Transportation Systems, vol. 8, No. 1, pp. 71-83, 2007.
Katrasnik et al., Analysis of Energy Conversion Efficiency in Parallel and Series Hybrid Powertrains, IEEE Transactions on Vehicular Technology, vol. 56, No. 6, pp. 3649-3659, 2007.
Kermani et al., PHIL Implementation of Energy Management Optimization for a Parallel HEV on a Predefined Route, IEEE Transactions on Vehicular Technology, vol. 60, No. 3, pp. 782-792, 2011.
Kotz et al., Lagrangian Hotspots of In-Use NOX Emissions from Transit Buses, Environmental Science and Technology, vol. 50, 5750-5756, 2016.
Li et al., Physics-guided Energy-efficient Path Selection: A Summary of Results. 26th ACM SIGSPATIAL International Conference on Advances in Geographic Information Systems, 10 pages, 2018.
Liang et al., A Deep Reinforcement Learning Network for Traffic Light Cycle Control, IEEE Transactions on Vehicular Technology, vol. 68, No. 2, pp. 1243-1253, 2019.
Lillicrap et al., Continuous control with deep reinforcement learning, Published as a conference paper at ICLR, 14 pages, 2016.
Lin et al., Machine learning-based energy management in a hybrid electric vehicle to minimize total operating cost, 2015 IEEE/ACM International Conference on Computer-Aided Design (ICCAD), pp. 627-634, 2015.
Liu et al., Adaptive critic learning techniques for engine torque and air-fuel ratio control, IEEE Transactions on Systems, Man, Cybernetics—Part B Cybernetics, vol. 38, No. 4, pp. 988-993, 2008.
Liu et al., Power management for plug-in hybrid electric vehicles using reinforcement learning with trip information, in Proc. IEEE ITEC, pp. 1-6, 2014.
Liu et al., Impact of Time Varying Passenger Loading on Conventional and Electrified Transit Bus Energy Consumption, Transportation Research Board Annual Meeting, 9 pages, 2019.
Martinez et al., Energy Management in Plug-in Hybrid Electric Vehicles: Recent Progress and a Connected Vehicles Perspective, IEEE Transactions on Vehicular Technology, vol. 66, No. 6, pp. 4534-4549, 2017.
Martinez et al., Driving Style Recognition for Intelligent Vehicle Control and Advanced Driver Assistance: A Survey, IEEE Transactions on Intelligent Transportation Systems, vol. 19, No. 3, pp. 666-676, 2018.
Mnih et al., Human-level control through deep reinforcement learning. Nature, vol. 518, No. 7540, pp. 529-533, 2015.
Murphy, Conjugate Bayesian analysis of the Gaussian distribution, Univ. British Columbia, Canada, Technical Report, 29 pages, 2007.
Overington et al., High-Efficiency Control of Internal Combustion Engines in Blended Charge Depletion/Charge Sustenance Strategies for Plug-In Hybrid Electric Vehicles, in IEEE Transactions on Vehicular Technology, vol. 64, No. 1, pp. 48-61, 2015.
Qi et al., Deep reinforcement learning-based vehicle energy efficiency autonomous learning system, IEEE Intelligent Vehicles Symposium (IV), pp. 1228-1233, 2017.
Qi et al., Development and Evaluation of an Evolutionary Algorithm-Based OnLine Energy Management System for Plug-In Hybrid Electric Vehicles, IEEE Transactions on Intelligent Transportation Systems, vol. 18, No. 8, pp. 2181-2191, 2017.

\* cited by examiner

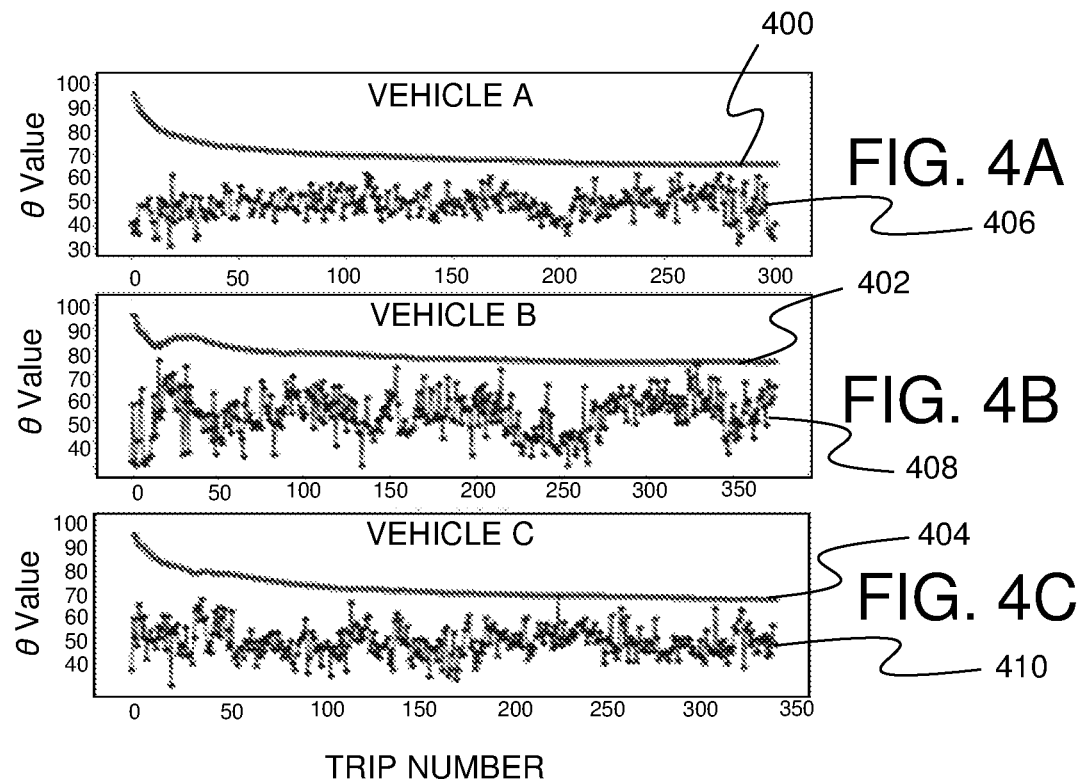
FIG. 4A
FIG. 4B
FIG. 4C
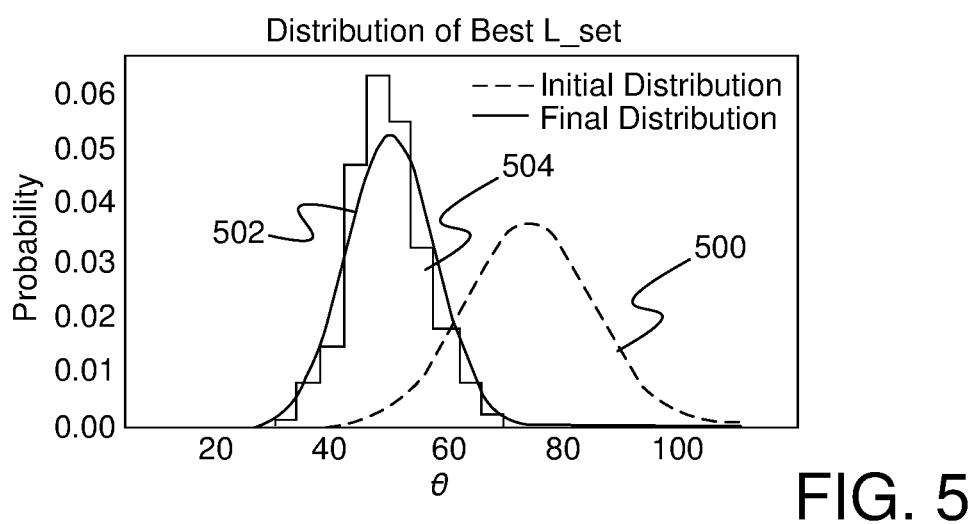
FIG. 5

Initialize the critic network $Q(s,a|\theta^Q)$ with random parameters $\theta^Q$
Initialize the target critic network $Q'(s,a|\theta^{Q'})$ with $\theta^{Q'} = \theta^Q$
Initialize the actor network $\mu(s|\theta^\mu)$ with random parameters $\theta^\mu$
Initialize the target actor network $\mu'(s|\theta^{\mu'})$ with $\theta^{\mu'} = \theta^\mu$
Initialize the replay buffer B to capacity $D$ with no transitions
Initialize $\varepsilon = 0.3, \tau = 0.001, D = 10^5, K = 48$
For epoch = 1, M do
  For trip = 1, N do
    Get initial state $s_0$ from current trip data
    While t < T, do
      Calculate action $a_t = \mu(s_t|\theta^\mu) + \varepsilon \cdot N(0,1)$
      Clip $a_t$ to the range of [-1, +1]
      Update current $L_{set}$ according to $A_{max} \cdot a_t$
      Run the vehicle model for 2000s with updated $L_{set}$
      Return state $s_{t+1}$ and reward $r_t$
      Store the transition $(s_t, a_t, r_t, s_{t+1})$ in the replay buffer B
      Sample $K$ random transitions $(s_i, a_i, r_i, s_{i+1})$ from B
      Set $y_i = r_i + \gamma Q'(s_{i+1}, \mu'(s_{i+1}|\theta^{\mu'})|\theta^{Q'})$
      Update critic network by minimizing the loss:
$$L = \frac{1}{K}\sum_{i=1}^{K}(y_i - Q(s_i, a_i|\theta^Q))^2$$
      Update the actor network using the sampled policy gradient:
$$\nabla_{\theta^\mu} J \approx \frac{1}{K}\sum_{i=1}^{K} \nabla_a Q(s,a|\theta^Q)|_{s=s_i, a=\mu(s_i)} \nabla_{\theta^\mu} \mu(s|\theta^\mu)|_{s_i}$$
      Perform soft update on target networks:
$$\theta^{Q'} \leftarrow \tau\theta^Q + (1-\tau)\theta^{Q'}$$
$$\theta^{\mu'} \leftarrow \tau\theta^\mu + (1-\tau)\theta^{\mu'}$$
      $s_t = s_{t+1}$
  End For
End For

FIG. 8

PHYSICAL MODEL-GUIDED MACHINE LEARNING FRAMEWORK FOR ENERGY MANAGEMENT OF VEHICLES

CROSS-REFERENCE OF RELATED APPLICATION

The present application is based on and claims the benefit of U.S. provisional patent application Ser. No. 62/743,321, filed Oct. 9, 2018, the content of which is hereby incorporated by reference in its entirety.

This invention was made with Government support under contract number DE-AR0000795 awarded by DOE, Office of ARPA-E. The Government has certain rights in this invention.

BACKGROUND

There are several types of electric vehicles. All-electric vehicles are moved by an electric motor that is powered by charge stored in a battery. The battery in an all-electric vehicle is recharged by plugging the vehicle into an external charger. Hybrid electric vehicles (HEV) switch between using an internal combustion engine and a battery-powered electric motor to move the vehicle. In such vehicles, the internal combustion engine drives a generator to recharge the battery. Range extended hybrid electric vehicles also include both an internal combustion engine and an electric motor, but only the electric motor is used to move the vehicle. The internal combustion engine is only used to recharge the battery. Range extended hybrid vehicles can also be plugged into external chargers to charge the battery without running the internal combustion engine.

SUMMARY

A method of determining when to increase an amount electrical energy available to a vehicle includes setting a parameter for a function describing a reference state of charge as a function of distance traveled, wherein the reference state of charge represents a state of charge of the vehicle at which the amount of electrical energy available to the vehicle should be increased. For each trip of the vehicle, the parameter for the function is modified so that different trips of a same vehicle use different functions for the reference state of charge.

In accordance with a further embodiment, a computer system includes a communication interface receiving trip information from a vehicle for a time period. A processor in the computer system receives the trip information from the communication interface and performing steps including using the trip information for the time period to change how a reference state of charge is determined, wherein the reference state of charge represents a state of charge of the vehicle at which an amount of electrical energy available to the vehicle should be increased.

In accordance with a still further embodiment, a computing device includes a memory storing trip information for a vehicle and a processor executing instructions to perform steps. The steps include using at least some of the trip information to alter a function used to determine a reference state of charge, wherein the reference state of charge represents a state of charge of the vehicle at which an amount of electrical energy available to the vehicle should be increased and wherein the reference state of charge changes during a vehicle trip. The altered function is then used to determine the reference state of charge.

BRIEF DESCRIPTION OF THE DRAWINGS

FIGS. 4A, 4B and 4C show respective predicted $\varphi$ curves relative to respective best $\varphi$ curves.

FIG. 5. provides an initial posterior predictive distribution of $\varphi$ and a final posterior predictive distribution of $\varphi$.

FIG. 8. provides a flow diagram of a method of training the actor and critic neural networks in accordance with one embodiment.

DETAILED DESCRIPTION OF ILLUSTRATIVE EMBODIMENTS

I. Introduction

Ideally, when driving an all-electric or range extended hybrid electric vehicle, the vehicle will complete the current trip without requiring recharging of the battery. Recharging an all-electric vehicle involves finding a charging station, plugging in the vehicle and waiting until a sufficient charge has been provided to the battery. This lengthens the time required to complete the current trip. Recharging a range extended hybrid electric vehicle involves running an internal combustion engine, which increases fuel costs and vehicle emissions. Thus, in both cases, it is best to limit the amount of battery recharging that takes place during a trip.

A significant challenge to limiting the amount of battery recharging that takes place during a trip is that it is extremely difficult determine what battery state of charge should trigger recharging. In particular, as the end of the trip approaches, less charge is required to reach the end of the trip. Thus, the charge level that triggers recharging should decrease over the course of the trip. In the discussion below, the charge level that triggers recharging is referred to as the reference state of charge. In other words, the reference state of charge represents a state of charge that triggers an instruction to increase the amount of electrical energy available to the vehicle either by plugging the vehicle in or running an internal combustion engine.

In the embodiments discussed below, the reference state of charge is determined as a function of the distance traveled during the current trip. The embodiments provide techniques for modifying this function so that the function minimizes the amount of additional electrical energy that must be made available during a trip while ensuring that the charge of the battery does not fall below a threshold value at any point during the trip.

Figure 1:
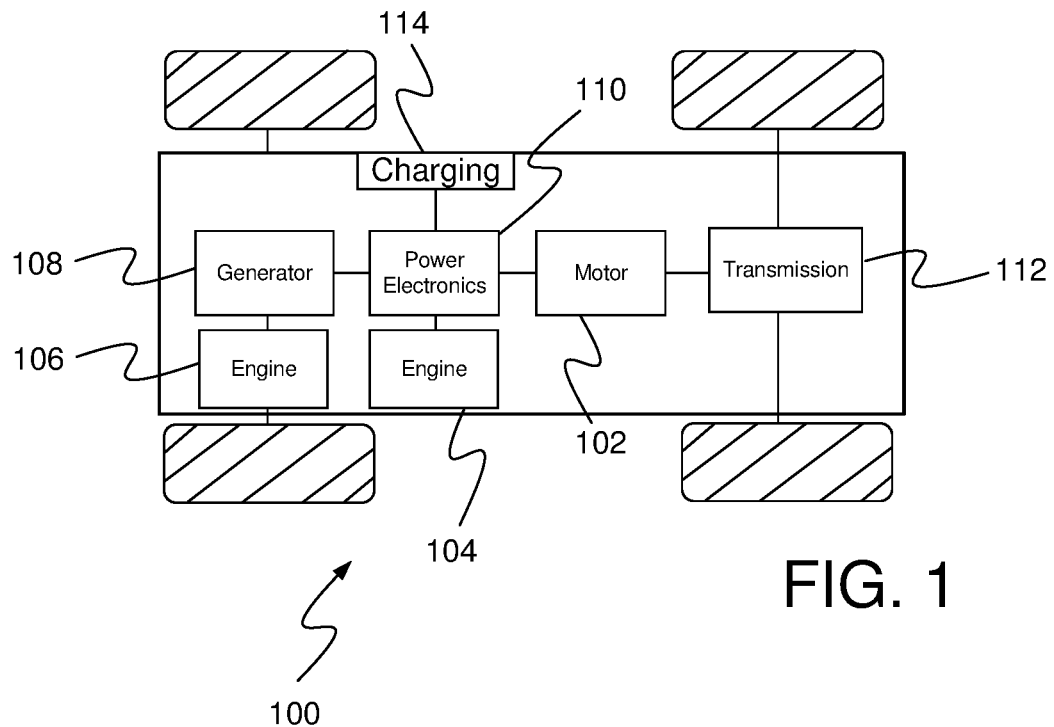
FIG. 1. provides a block diagram of a range extended hybrid vehicle.

FIG. 1 provides a block diagram of a range extended hybrid vehicle 100 that is used with the various embodiments. The motive power of the vehicle is provided by an electric motor 102, which uses stored energy from a large battery 104 to drive a transmission 112. An internal combustion engine 106 serves as a range-extender by driving a generator 108 to charge battery 104. Power electronics 110 control the movement of current to and from battery 104. There is no mechanical connection between the output shaft of internal combustion engine 106 and transmission 112. A charging interface 114, such as a plug, can be plugged into an external charger to recharge battery 104 when vehicle 100 is not moving.

Figure 2:
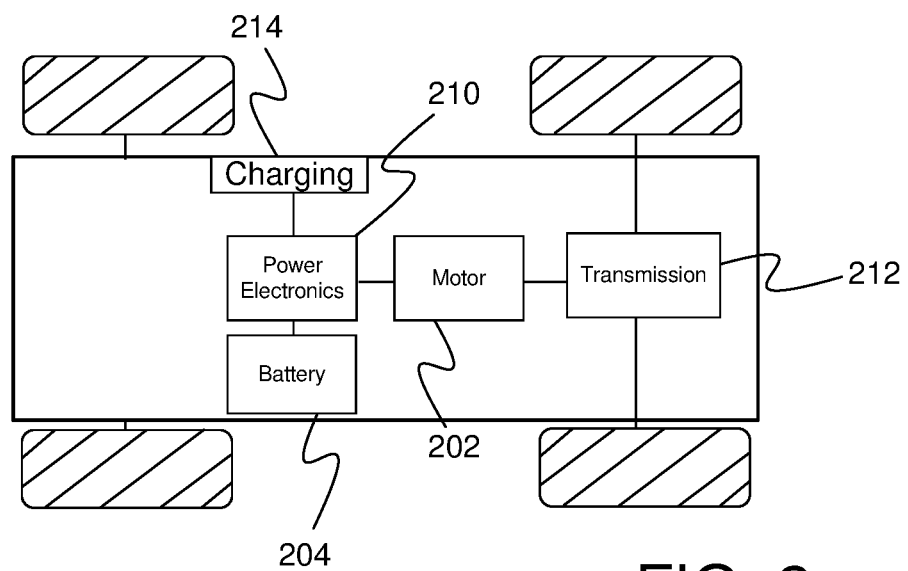
FIG. 2 provides a block diagram of an all-electric vehicle.

FIG. 2 provides a block diagram of an all-electric vehicle 200 that is used in the various embodiments. The motive power of the vehicle is provided by an electric motor 202, which uses stored energy from a large battery 204 to drive a transmission 212. A charging interface 214, such as a plug, can be plugged into an external charger to recharge battery 204 when vehicle 200 is not moving. Power electronics 210 control the movement of current to and from battery 204.

To maximize the energy use from the battery without running out of battery, the reference state of charge ($SOC_{ref}$) is designed to reach a target SOC value at the end of the trip, denoted as $SOC_{tev}$. The $SOC_{ref}$ is defined as:

$$SOC_{ref} = \min((1-f(d)_\varphi)*100\%, 60\%) \quad (1)$$

where d is the distance a vehicle has traveled so far on a given trip and $\varphi$ represents one or more parameters of the function f(d) and the reference state of charge is set to a maximum of 60% to prevent recharging of the battery when the state of charge is greater than 60% thereby reducing fuel consumption and preventing charging the battery too many times, which will degrade the battery's life. In the reference state of charge equation, $f(d)_\varphi$ has a value between zero and $$\left(1 - \frac{SOC_{tev}}{100\%}\right).$$

For example, for an $SOC_{tev}$ of 10%, $f(d)_\varphi$ has a value between zero and 0.9. In some embodiments, $f(d)_\varphi$ is a linear function such as:

$$f(d)_\varphi = \frac{0.9d}{L_{set}} \quad (2)$$

where 0.9 and $L_{set}$ are the parameters $\varphi$ of $f(d)_\varphi$. Ideally, if $L_{set}$ matches the actual total route distance, the vehicle finishes the trip with $SOC_{tep}$, and is charged at the depot using the electricity from the grid at night, minimizing fuel consumption. However, $L_{set}$ is difficult to determine because it is difficult to estimate the trip distance accurately a priori. Vehicles in different delivery areas have very different distributions of trip distances day-to-day. Also, for an individual vehicle, the trip distances in actual routes vary from the scheduled distance and differ day-to-day based on delivery demand, driver behavior, vehicle weight difference, weather and traffic, for example, even though the vehicles might traverse the same region each day.

Figure 3:
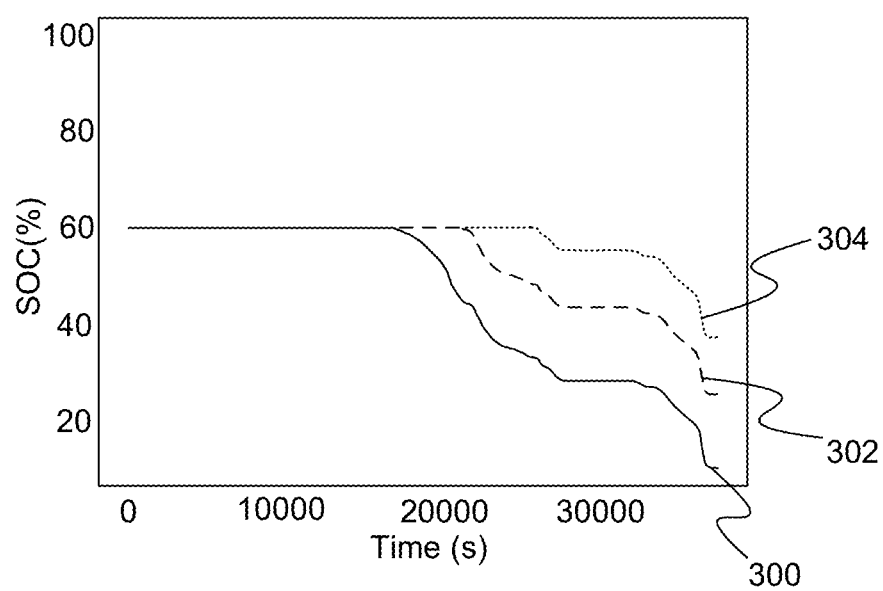
FIG. 3 provides graphs of three $SOC_{ref}$ functions

By changing the parameters $\varphi$ of $f(d)_\varphi$, different functions for $SOC_{ref}$ can be created. For example, FIG. 3 provides graphs of three $SOC_{ref}$ functions 300, 302 and 304, each having a different value for $L_{set}$, which is one of the parameters $\varphi$ in Equation 2 above. Because $SOC_{ref}$ functions 302 and 304 produce higher $SOC_{ref}$ values during later parts of the trip, it is more likely that recharging will be triggered when those $SOC_{ref}$ functions are used. Thus, it may seem that it would be best to select the $L_{set}$ value that produces $SOC_{ref}$ function 300 since it will be least likely to trigger recharging. However, if an $SOC_{ref}$ function is selected that does not trigger recharging early enough, the vehicle may run out of charge. For range extended hybrid electric vehicles, this can occur when the electric motor draws more current than the combustion engine can provide such as when the vehicle is driving uphill. When this occurs, the battery continues to discharge even though the combustion engine is running and it is possible that the battery will run out of charge. For all-electric vehicles, the battery can run out of charge if the notification to recharge is received too late to reach a recharging station on the remaining charge. Thus, the best $SOC_{ref}$ function is not necessarily the one that waits the longest to trigger recharging. Instead, the best $SOC_{ref}$ function is the one that will require the least amount of additional electricity be provided to the vehicle while ensuring that the state of charge of the vehicle does not fall below some threshold.

In the embodiments described below, a vehicle model is used to calculate a best $SOC_{ref}$ function for each trip of the vehicle. Table 1 provides the parameters necessary for the vehicle model.

TABLE I

VEHICLE MODEL PARAMETERS

| Symbol | Parameter |
|---|---|
| $c_{rr}$ | Coefficient of rolling resistance |
| $C_d$ | Coefficient of air resistance |
| $P_b$ | Battery power |
| $P_e$ | Engine/Charger power |
| $P_{btw}$ | Battery to wheel power |
| $P_{etw}$ | Engine/Charger to wheel power |
| $\eta_{btw}$ | Efficiency from battery to wheel |
| $\eta_{etw}$ | Efficiency from engine/charger to wheel |
| $\rho$ | Air density |
| A | Frontal area |
| m | Total mass |
| $V_{oc}$ | Open circuit voltage |
| $R_0$ | Battery internal resistance |
| Q | Battery capacity |
| f | Cumulated fuel use |

The vehicle force demand can be written in the following form:

$$F_{demand} = F_{acceleration} + F_{roll} + F_{air} + F_g \quad (3)$$

Where $$F_{acceleration} = ma$$

$$F_{roll} = c_{rr} mg \cos(\theta)$$

$$F_{air} = \tfrac{1}{2} c_d A \rho v^2$$

$$F_g = mg \sin(\theta) \quad (4)$$

Neglecting the road grade and the power estimated as P=Fv gives:

$$P_{demand} = mav + c_{rr} mgv + \tfrac{1}{2} c_d A \rho v^3 \quad (5)$$

The power in the case of an ReHEV and an all-electric vehicle is provided solely by the electric motor, which uses energy from the battery, $P_{btw}$, and an additional source of electrical energy (the combustion engine for range-extended hybrid electric vehicles and an external charger for all-electric vehicles), $P_{etw}$, do that:

$$P_{demand} = P_{btw} + P_{etw} \quad (6)$$

where $$P_{btw} = (P_b - P_{accessary}) \eta_{btw}$$

$$P_{etw} = P_e \eta_{etw} \quad (7)$$

Neglecting the power consumption of accessories, the power of battery is:

$$P_b = \frac{\left(c_{rr} mgv + \tfrac{1}{2} c_d A \rho v^3 + mav\right)}{\eta_{btw}} - \frac{P_e \eta_{etw}}{\eta_{btw}} \quad (8)$$

By assuming $\eta_{btw}$, $\eta_{etw}$, m, g, $c_{rr}$, A, $c_w$, $\rho$ are all constants and the fact $P_e$ is a constant (neglecting the transition process from on to off and off to on), we can rewrite this equation with the dependence on time t as:

$$P_b(t) = Av(t) + Bv^3(t) + Ca(t)v(t) - D \quad (9)$$

Where:

$$A = \frac{c_{rr} mg}{\eta_{btw}} \quad (10)$$

$$B = \frac{\tfrac{1}{2} c_d A \rho}{\eta_{btw}}$$

$$C = \frac{m}{\eta_{btw}}$$

$$D = \frac{P_e \eta_{etw}}{\eta_{btw}}$$

Battery Model

A simplified battery model is used to model the battery pack:

$$P_b(t) = V_{oc}(s) I(t) - R_0(s) I^2(t) \quad (11)$$

$V_{oc}$ (s) and $R_0(s)$ depends on SOC (s). The derivative of s is proportional to current at the battery terminals:

$$\dot{s}(t) = -\frac{1}{Q} I(t) \quad (12)$$

Solving the current from the battery power equation and substituting the current into the above equation:

$$\dot{s}(t) = -\frac{V_{oc}(s) - \sqrt{V_{oc}^2(s) - 4R_0(s) P_b(t)}}{2 R_0(s) Q} \quad (13)$$

$V_{oc}(s)$ can be modeled as a piecewise linear function of the SOC and $R_0(s)$ can be modeled as a constant $R_0(s) = R_0$. By combining Equations 9 and 13, we can use velocity profile as input to calculate the SOC profile step by step given the initial SOC:

$$s(t+\Delta t) = s(t) + \dot{s}(t) \Delta t \quad (14)$$

If the vehicle is stopped and the engine is on or the charger is plugged in, the SOC update is simply:

$$s(t+\Delta t) = s(t) + C_{charging\ rate} \Delta t \quad (15)$$

In our case, $\Delta t = 1$, which means the step size is 1 second.

Engine Model

In accordance with one embodiment, the engine is modeled as working in a fixed condition where the fuel rate and engine charging power are both constant. The transition process from off to on and on to off is neglected. So, when the engine is turned on:

$$f(t+\Delta t) = f(t) + C_{fuel\ rate} \Delta t \quad (16)$$

To use this vehicle model, data is collected from the vehicle using on-board diagnostics measurements. Measured parameters include the status of the power system (e.g., SOC, additional electrical energy made available to the battery), the vehicle's movement (e.g., odometer, speed), and others (e.g., fuel consumption, emissions). In accordance with one embodiment, 355 parameters per vehicle in total are recorded with the timestamp and the vehicle's location every five seconds when the vehicle is running.

Data from the vehicles were stored in a secure spatial database instance with support for geometry objects and spatial indexes. The database schema consists of three main tables:

Vehicle, TripSummary, and EGENDriveTrip.

The Vehicle table records properties of each vehicle, such as the make, model, and year. Every record in TripSummary is a summary of a single delivery trip of a vehicle. Each summary contains attributes such as the starting date and time, duration, and distance. In addition, each summary is associated with a trip trajectory, which is composed of a series of spatial points stored in the EGENDriveTrip table. Each record in EGENDriveTrip describes the spatial location of a vehicle at a specific timestamp. It also contains the on-board diagnostics measurements of the vehicle at that time. To ensure data security, a virtual machine is employed to process and import data.

Data Preprocessing

Data quality is crucial to the accuracy of the vehicle simulation. However, raw data from on-board diagnostics frequently have errors. Three common problems include low resolution, missing values, and wrong values. In the case of the dataset used here, low update rate results in a stepped profile shape for vehicle distance, requiring interpolation. Velocity occasionally remains at 0 even when the corresponding distance increases. The low-resolution problem in velocity profile can degrade the accuracy level of the model that solves the SOC step by step. The missing value problem can introduce high error. For example, if several zero-velocity data points are missing between two non-zero velocity data points, the model will connect the two non-zero velocity linearly and consider the vehicle does not stop. To solve these problems in the raw data, a data preprocessing procedure is used to preprocess the data iteratively. Interpolation and Gaussian filters are first used to correct low-resolution and missing values. These methods use the information in distance profile to correct the wrong velocity value problem iteratively.

The trip-level data preprocessing procedure is:
Step 1
Zero-filling and forward-filling for the velocity profile and distance profile respectively to fill in the missing values;
Step 2
For both profiles, interpolate the 5 second data into 1 second data linearly;
Step 3
Use Gaussian filter to process the distance profile and velocity profile to get smoothed distance profile and velocity profile, the degree of smoothness is determined by $\sigma_1$ and $\sigma_2$;
Step 4
Calculate a new velocity profile from smoothed distance profile by second order finite difference method (for the first and last data point, velocity is zero):

$$v^{new}(t) = \frac{d(t+\Delta t) - d(t-\Delta t)}{2\Delta t} \quad (17)$$

Step 5
Compare every point of the smoothed velocity profile and the corresponding point in the new velocity profile calculated from the smoothed distance profile and update all points that the value is 0 in the smoothed velocity profile and the value is not 0 at new velocity profile into the non-zero value multiplies by a factor E;
Step 6
Calculate new distance profile by the smoothed and corrected velocity profile and if the final distance calculated has an error smaller than 500 m, the preprocessing is finished. Otherwise, go back to step 5 and update E according to the value of error until the stopping criteria is satisfied.

As the actual velocity profile should be continuous and the velocity and acceleration cannot be too large, a Gaussian filter is used to infer the distance and velocity information between the 5 second data. Also, the smoothing process improves the data quality of the distance profile largely so that a new velocity profile can be found in step 4. Without the Gaussian filter, the velocity calculated from distance profile will yield unrealistic high velocities at the points where distance changes. Also, at some data points, the acceleration calculated from the unsmoothed velocity profile will be too high. Step 5 corrects for wrong velocity values. However, the velocity value calculated from the smoothed distance profile is not accurate requiring a factor to scale the velocity. This procedure refines the data on a trip level.

Below, two Energy Management Strategy (EMS) embodiments are discussed for optimizing the $SOC_{ref}$ function. The first is referred to as a Bayesian Algorithm, which defines a prior probability distribution for a parameter of the $SOC_{ref}$ function and then uses that prior probability distribution to update the parameter, and thus change the $SOC_{ref}$ function, after each trip of the vehicle. The second embodiment is referred to as a Reinforcement Learning Algorithm, which uses a neural network to select a change to a parameter of the $SOC_{ref}$ function, and thus change the $SOC_{ref}$ function, while a trip is in progress.

Bayesian Algorithm

A naive approach for programming individual vehicles would be to determine the parameters $\varphi$ for a future trip by using a determined best $\varphi$ determined over all historical trips. However, it is not straightforward to determine how to estimate the proper parameters $\varphi$ as there is uncertainty about future trips. Further, if a vehicle has made only a few trips, the statistical strength of such a prediction will be low. To address this uncertainty, the present embodiments model the distribution of best $\varphi$ of each vehicle using a Gaussian distribution. For new vehicles or for vehicles driving new route profiles, the number of trips is very small or zero so that it is nearly impossible to have a good estimation of the distribution. To deal with this problem, the parameters of the Gaussian distribution (mean and precision) are estimated using a Bayesian algorithm. The distribution parameters are determined by both data and prior knowledge. Every time new trip data is available, distribution parameters are updated adaptively. Once the distribution parameters are updated, the parameters $\varphi$ of the $SOC_{ref}$ function are calculated conservatively by the cumulative density function (CDF) of the posterior predictive model.

The actual best parameters $\varphi$ is assumed to follow a Gaussian distribution with unknown mean and unknown precision:

$$p(\varphi) \sim N(\mu, \lambda) \quad (18)$$

where $\mu$ is the unknown mean and $\lambda$ is the unknown precision which is defined as:

$$\lambda = \frac{1}{\sigma^2},$$

the reciprocal of variance.

To simplify the notation, $\varphi^{[N]}$ and $\hat{\varphi}^{[N]}$ represents actual best $\varphi$ and predicted $\varphi$ for the Nth trip.

Given historical data from N trips, the likelihood can be written in the form:

$$p(\varphi^{[1]}, \varphi^{[2]} \ldots \varphi^{[N]} \mid \mu, \lambda) = \frac{\lambda^{\frac{N}{2}}}{(2\pi)^{\frac{N}{2}}} \exp\left[-\frac{\lambda}{2} \sum_{i=1}^{N} (\varphi^{[i]} - \mu)^2\right] \quad (19)$$

If we calculate $\hat{\varphi}$ using the distribution estimated only on the historical data by maximizing the likelihood in Equation 19, when the size of data is small or no data, the $\hat{\varphi}$ calculated will be highly unstable, leading to undesirable performance of the vehicle in reality. To solve this problem, a prior probability distribution is introduced to make the model more conservative.

Assuming the posterior is proportional to the product of the prior and the likelihood, the form of posterior is given as:

$$p(\mu, \lambda \mid \varphi^{[1]}, \varphi^{[2]} \ldots \varphi^{[N]}) \propto p(\mu, \lambda) \cdot p(\varphi^{[1]}, \varphi^{[2]} \ldots \varphi^{[N]} \mid \mu, \lambda) \quad (20)$$

By introducing a prior distribution, $\mu$ and $\lambda$ is estimated based on both the information from data and our prior knowledge. This can give us a more conservative estimation for small N. The concept of conjugate prior from Bayesian probability theory is used, which considerably simplifies the analysis. If a prior distribution is conjugate to the likelihood function of a given distribution, the posterior distribution will have the same form of distribution as the prior. The conjugate prior for a Gaussian distribution with unknown mean and unknown precision is the Normal-Gamma distribution: $p(\mu, \lambda) \sim \text{Normal-Gamma}(\mu_0, k_0, a_0, b_0)$.

So, the posterior distribution is also Normal-Gamma:

$$p(\mu, \lambda \mid \varphi^{[1]}, \varphi^{[2]} \ldots \varphi^{[N]}) \sim \text{Normal-Gamma}(\mu_N, \kappa_N, a_N, b_N)$$

-continued where:

$$\mu_N = \frac{K_0\mu_0 + Nm}{K_N} \quad (21)$$

$$K_N = K_0 + N$$

$$a_N = \frac{1}{2}(2a_0 + N)$$

$$b_N = b_0 + \frac{N}{2}s^2 + \frac{K_0 N}{2K_N}(m-\mu_0)^2$$

To make a prediction of CO for the next trip, we integrate over the posterior:

$$p(\hat{\varphi} \mid \varphi^{[1]}, \varphi^{[2]} \ldots \varphi^{[N]}) = \quad (22)$$

$$\int\int p(\hat{\varphi} \mid \mu, \lambda) p(\mu, \lambda \mid \varphi^{[1]}, \varphi^{[2]} \ldots \varphi^{[N]}) d\mu d\lambda \sim t_{2a_N}\left(\mu_N, \frac{b_N(\kappa_N+1)}{a_N\kappa_N}\right)$$

Given the prior and historical data, the posterior predictive model for the next $\hat{\varphi}$ is a t-distribution. Robustness is one of the main characteristics of t-distribution. It has longer 'tails' than Gaussian distribution, which means the position and shape of the t-distribution is less sensitive to outliers, which is advantageous in this application. There are four parameters in the t-distribution: $\mu_N$, $\kappa_N$, $a_N$, $b_N$. These are determined by historical data and the parameters in the prior distribution: $\mu_0$, $\kappa_0$, $a_0$, $b_0$. It is important to understand the meaning of these parameters to design a good prior for this approach. To make this more straightforward, consider a new group of parameters: $\mu_0$, $n_{\mu_0}$, $\lambda_0$, $n_{\lambda_0}$, where $\mu_0$ is the prior estimate of the mean. $n_{\mu_0}$ is the size of pseudo samples on which we believe $\mu_0$ is estimated. $\lambda_0$ is the prior precision estimate. $n_{\lambda_0}$ is the size of pseudo samples on which we believe $\lambda_0$ is estimated. $n_{\mu_0}$ and $n_{\lambda_0}$ represent how confident we are about the prior mean and precision. These parameters are represented by the following:

$$\mu_0 = \mu_0 \quad (23)$$

$$\kappa_0 = n_{\mu_0}$$

$$a_0 = \frac{n_{\lambda_0}}{2}$$

$$b_0 = \frac{n_{\lambda_0}}{2\lambda_0}$$

To determine a prior, the only four parameters that need to be specified are $\mu_0$, $n_{\mu_0}$, $\lambda_0$, $n_{\lambda_0}$. After these parameters are determined, the posterior predictive model $p(\hat{\varphi}|\varphi^{[1]}, \varphi^{[2]} \ldots \varphi^{[N]})$ is determined. This t-distribution is used to calculate the $\hat{\varphi}$ for the next trip. After the data of the next trip is observed, the previous posterior becomes the prior and the distribution is updated according to the new observation.

The procedure for calculating $\hat{\varphi}$ and updating parameters is described as follows:
1) Initialization Step.
The initial t-distribution is $$t_{2a_N}\left(\mu_N, \frac{b_0(\kappa_N+1)}{a_N\kappa_N}\right),$$

which is completely determined by the prior when no trip information is available (N=0), leading to:

$$\mu_N = \frac{K_0\mu_0 + Nm}{K_N} = \mu_0 \quad (24)$$

$$K_N = K_0 + N = K_0$$

$$a_N = \frac{1}{2}(2a_0 + N) = a_0$$

$$b_N = b_0 + \frac{N}{2}s^2 + \frac{K_0 N}{2K_N}(m-\mu_0)^2 = b_0$$

2) Prediction Step
The prediction step is based on the CDF of the t-distribution. The value of the CDF evaluated at $\hat{\varphi}$, is the probability that the next actual best $L_{set}$ will take a value less than or equal to our predicted $L_{set}$:

$$CDF_\varphi(\hat{\varphi}) = P(\theta \leq \hat{\varphi}) \quad (25)$$

We determine the $\hat{\varphi}^{[N+1]}$ by setting the CDF=0.99, which means $\varphi^{[N+1]}$ will be smaller than our calculated value with a probability of 0.99 under our assumption. From this point, it can be seen that, the calculated $\hat{\varphi}$ will be higher than the actual ideal $\varphi$ by a margin in most trips. For real-world driving, low $\varphi$ leading to a very low SOC during a trip should be avoided to a high confidence level even at the expense of smaller improvement in fuel economy.

3) Update Step
After a new trip is observed, the parameters in the prior are updated by the parameters in the posterior; i.e., after new data is recorded. The previous posterior information becomes prior for the new information:

$$\mu_0^{new} = \mu_N^{old}$$

$$K_0^{new} = K_N^{old}$$

$$a_0^{new} = a_N^{old}$$

$$b_0^{new} = b_N^{old} \quad (26)$$

The parameters in the posterior are then updated using Equation 21 with N=1, m=θ and $s^2$=0 according to:

$$K_N^{new} = K_0^{new} + 1 \quad (27)$$

$$\mu_N^{new} = \frac{K_0^{new}\mu_0^{new} + \theta}{K_N^{new}}$$

$$a_N^{new} = \frac{1}{2}(2a_0^{new} + 1)$$

$$b_N^{new} = b_0^{new} + \frac{K_0^{new}}{2K_N^{new}}(\theta - \mu_0^{new})^2$$

Where m=φ is the best $SOC_{ref}$ function parameter for the latest trip. To find this best φ, a simplified vehicle model (described below) is run iteratively over the preprocessed velocity profile from the latest trip using different values for φ to control when the model vehicle is provided with additional electrical energy. The simplified vehicle model predicts the amount of charge that the vehicle will use during different parts of a velocity profile and predicts the rate at which the vehicle will receive charge when additional electrical energy is provided to the vehicle. For each tested value of φ, the minimal SOC of the trip and the amount of additional electrical energy that was provided to the vehicle are recorded. The value of φ that requires the least amount of additional electrical energy while ensuring that the state of charge remains above some threshold (such as 10%) is then selected as the best φ for the latest trip and is used to update the prior probability distribution parameters as shown in Equation 27.

After updating the parameters in the t-distribution. $\hat{\varphi}$ for the next trip can be calculated by the prediction step.

Designing of the Prior

In this section, a prior is designed for use in the Bayesian algorithm by determining the parameters $\mu_0$, $n_{\mu_0}$, $\lambda_0$, $n_{\lambda_0}$ from the collected vehicle data so that the $\hat{\varphi}$ calculated is conservative, especially for small N or when no data are available for new vehicles. The origin $\overline{\varphi}$ can be used as an initial condition. The parameters of the prior are then updated using the best φ for each of a collection of historic trips. In accordance with one embodiment, multiple different vehicles are used to provide the historic trip data.

For each vehicle, the initialization, prediction and update steps described above are performed using the best φ for each historic trip of the vehicle and a common set of prior probability parameters that are being tested. This produces a curve of predicted $\hat{\varphi}$ for each vehicle that starts far from the curve of best φ and descends toward the best φ as the number of historic trips increases. For example, FIGS. 4A, 4B and 4C show respective predicted $\hat{\varphi}$ curves 400, 402 and 404 relative to respective best φ curves 406, 408 and 410, where the value of φ is shown along the vertical axis and a historic trip number is shown along the horizontal axis. The prior probability parameters are varied until one or more of the predicted $\hat{\varphi}$ curves touch a respective best φ curve. An example of prior probability parameters determined in this way are shown in table II.

TABLE II

BAYESIAN MODEL PARAMETERS

| Parameter | Value |
|---|---|
| $\mu_0$ | 74 |
| $n_{\mu_0}$ | 5 |
| $\lambda_0$ | 0.01 |
| $n_{\lambda_0}$ | 50 |

The underlying meaning of the parameters is the prior mean is 74, which was estimated from 5 pseudo samples. The prior precision is 0.01, which is estimated on 50 pseudo samples. The reason of a low number of pseudo samples of mean and a relative high number of pseudo samples of precision can be explained as when the number of data is small, the variance of data can be very large which will lead to a very small precision so that we use more pseudo samples of precision to make the model stable.

The initial posterior predictive distribution 500 of φ only determined by the prior probability distribution and the final posterior predictive distribution 502 using all trip data of vehicle C are shown in FIG. 5. Also, the actual best φ data is shown in the form of histogram 504. As shown in FIG. 5, the final posterior predictive distribution 502 provides an accurate representation of the actual best φ.

Simulation and in-Use Data Study

Validation of the Vehicle Model

Figure 6:
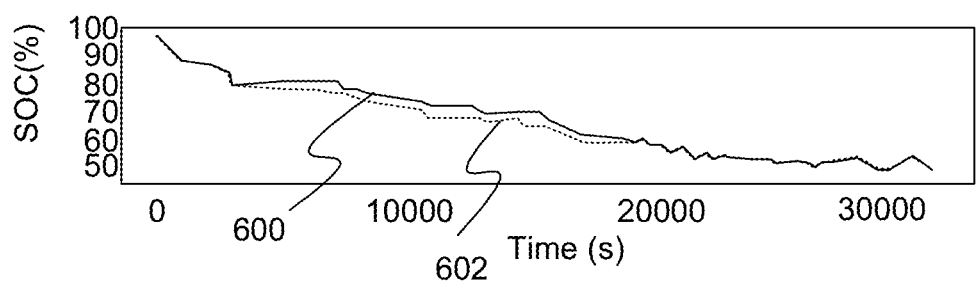
FIG. 6 provides graphs of raw SOC data and simulated SOC data for an actual trip.

The accuracy of the vehicle model is very important to the developed framework. As the engine on and off control logic is based on the SOC value, validation of the model is mainly based on the SOC curve. Starting with the same vehicle model, we calibrated the parameters for different vehicles on each route with several trips. After calibration, the model will perform consistently on the other trips for the same vehicle. The error comes from our simplification of the vehicle model, which neglects wind speed, road grade and the assumes constant vehicle components efficiencies. Also, noisy and low-resolution raw data introduces error even after the preprocessing process. Furthermore, the SOC value in the raw data itself contains some level of error as the SOC value is not measured directly. Some degree of error is inevitable in all vehicle measurement datasets. As an example, raw SOC data 602 and simulated SOC data 600 for one vehicle are shown in FIG. 6 for an actual trip. The simulation accuracy of all recorded trips and vehicles in the dataset are similar. Considering raw data quality and model complexity as well as our goal of determining additional electrical energy provided under different φ, the accuracy of the model is deemed adequate.

Additional Electrical Energy with Different φ

Figure 7:
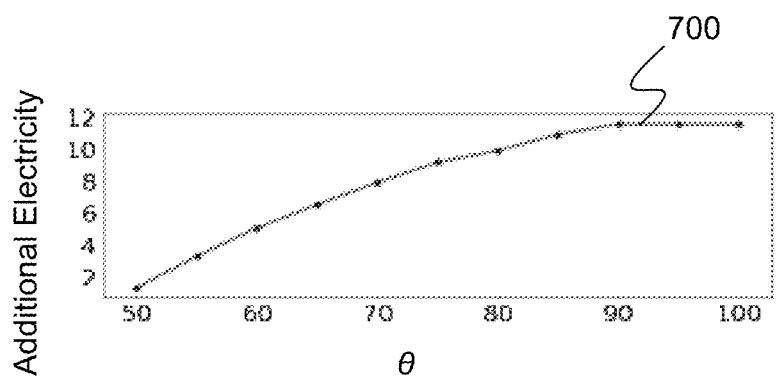
FIG. 7. provides a graph of additional electrical energy for different $\varphi$.

Additional electrical energy provided in a particular trip is a function of φ. It was observed that a reduction in additional electrical energy is not guaranteed when φ is lowered. Also, the amount of additional electrical energy will not increase after it is higher than a particular value. For example, graph 700 of FIG. 7 shows additional electrical energy for different φ for a trip of a vehicle. Graph 700 shows that the amount of additional electrical energy flattens out as φ increases.

Fuel Efficiency Improvement

For range extended hybrid electric vehicles, the fuel efficiency improvement achieved using an energy management system of the various embodiments can be quantified by fuel use and the mile per gallon equivalent (MPGe). MPGe is estimated by the equation:

$$MPGe = \frac{\text{distance (mile)}}{\text{fuel use (gallon)} + \frac{\text{electric energy use (kwh)}}{33.7 \left(\frac{\text{kwh}}{\text{gallon}}\right)}} \quad (28)$$

MPGe improvement has demonstrated on five range extended vehicles on real-world delivery trips, two of which have more than 15 trips.

All fuel reduction data for the five demonstration range extended hybrid electric vehicles is summarized in table III.

TABLE III

Fuel efficiency improvement

| Vehicle Number | Average MPGe Improvement (%) | Average Fuel Reduction (%) | Number of Trips |
|---|---|---|---|
| E | 9.0 | 11.0 | 15 |
| F | 8.7 | 13.9 | 35 |
| G | 7.9 | 11.3 | 2 |
| H | 11.8 | 16.1 | 2 |
| I | 5.8 | 9.1 | 2 |

Reinforcement Learning Algorithm

The reinforcement learning algorithm embodiment trains a neural network to change the parameter φ of the $SOC_{ref}$ function during a vehicle trip. The embodiment uses an actor-critic based algorithm called a deep deterministic policy gradient (DDPG) to train the neural network.

In reinforcement learning problems, an agent neural network and environment interact with each other through state (s), reward (r) and action (a). At the beginning of the interaction, the initial state $s_0$ is provided by the environment. The agent observes $s_0$ and calculates an action $a_0$ according to its policy π: s→a which is a mapping from state to action. The environment receives the $a_0$ and outputs the immediate reward $r_0$ and the next state $s_1$. The interaction will go on until a terminal state $s_T$ is reached which give rise to a sequence like:

$$s_0, a_0, r_0, s_1, a_1, r_1, s_2, a_2, r_2 \ldots s_T \tag{29}$$

The goal of the agent is to maximize its discounted cumulated reward at each time step through a sequential decision-making process. The discounted cumulated reward at time step t is defined as:

$$G_t = r_t + \gamma r_{t+1} + \gamma^2 r_{t+2} + \ldots \tag{30}$$

where γ is the discount factor with a range from 0 to 1. When it equals to 1, the agent is farsighted, considering all future rewards equally. When it sets to be 0, the agent will only consider the immediate reward, being myopic. As the reward in the future is less likely to get compared with the immediate reward, it is often set to be a number slightly smaller than 1, for example, 0.99 is widely used.

A classical formulation of sequential decision-making problem is the Markov Decision Process (MDP). Under this formulation, the environment responds to the agent by transition probability $p(s_{t+1}, r_t | s_t, a_t)$ which only considers the current time step t, ignoring all previous history.

The problem of selecting the parameter φ of the $SOC_{ref}$ function is first formulated as an MDP below and then the RL algorithm used to solve the MDP is discussed.

An MDP can be represented by a tuple (s, a, p, r, γ). The agent in the present embodiment is the policy π that can update φ during the trip. The environment $P(s_{t+1}, r_t | s_t, a_t)$ is approximated by historical delivery trips and the vehicle model. The historical trips have various distance and energy intensity, which can help the agent learn a generalized strategy for different conditions. The vehicle model is used to calculate the SOC change and the amount of additional electrical energy required given velocity profiles. The additional electrical energy required is then used to calculate the reward, and consequently the next state. The state is the real-time information that the agent has access to. It is represented as a vector at each time step:

$$s_t = [t_{travel}, d, SOC, f, x, y, \varphi] \tag{31}$$

where $t_{travel}$ is the travelled time, d is the travelled distance, SOC is the current state of charge, f is the current total additional amount of electrical energy, x and y are the GPS coordinates, and φ is the current φ setting. The agent can only observe this information when making a decision.

The action space is a predefined range:

$$a_t \in [-A_{max}, A_{max}] \tag{32}$$

In accordance with one embodiment, $a_t$ is the amount by which φ is changed. In some embodiments, if the magnitude of the change is below a threshold, φ is not changed during the time step.

The reward at each time step t is defined as:

$$r_t = r_f f_{,t} + r_{SOC} t_{SOC,t} + r_{a,t} + r_c \tag{33}$$

where the first term penalizes providing additional electrical energy and its magnitude is proportional to the the time $t_{f,t}$ spent providing additional electrical energy with coefficient $r_f$ equal to −0.001. The second term penalizes the condition of SOC lower than 10% and its magnitude is proportional to the amount of time under that condition $t_{SOC,t}$ with coefficient $r_{SOC}$ equal to −0.060. To guide the algorithm in finding an efficient policy, $r_{a,t}$ is added to penalize actions that change φ. It will cause a reward of −0.020 if the φ is changed.

The first term $r_f f_{,t}$ penalizes all additions of electrical energy during the trip as the remaining distance and energy intensity is unknown. However, for trips exceeding the vehicle's all-electric range, the additional electrical energy is necessary to keep the SOC larger than 10%. Consequently, to compensate the negative reward caused by the necessary additional electrical energy, a reward term $r_c$ is imposed at the end of the trip. After the trip is finished, the amount of fuel that is necessary to keep the SOC larger than 10% is simulated using the vehicle model, which determines the magnitude of $r_c$. For example, if after a delivery trip it is calculated that 1 gallon of fuel must be used to keep the SOC larger than 10% during the trip and the actual fuel use is 1.5 gallon, the negative reward caused by the 1 gallon will be compensated by the $r_c$ term.

Training

The neural network μ represents a deterministic policy π and is parametrized by $\theta^\mu$. Given a state $s_t$, the corresponding action is calculated by:

$$a_t = \pi_{\theta^\mu}(s_t) = \mu(s_t | \theta^\mu) \tag{34}$$

The performance J of policy $\pi_{\theta^\mu}$ can be expressed as:

$$J(\theta^\mu) = E_{\tau \sim p_{\theta^\mu}(\tau)}[r(t)] \tag{35}$$

where τ is a trajectory of interaction:

$$s_0, a_0, s_1, a_1, s_2, a_2 \ldots s_T \tag{36}$$

$p_{\theta^\mu}(\tau)$ is the distribution of trajectory τ under policy $\pi_{\theta^\mu}$ and a certain environment:

$$p_{\theta^\mu}(\tau) = p(s_0) \Pi_{t=0}^T \pi_{\theta^\mu}(s_t) p(s_{t+1} | s_t, a_t) \tag{37}$$

r(τ) is the total discounted reward for a trajectory τ:

$$r(\tau) = \Sigma_{t=0}^T \gamma^t r(s_t, a_t) \tag{38}$$

Eq. (34) represents the expected discounted cumulated reward that the policy $\pi_{\theta^\mu}$ can achieve in a certain environment. To improve the performance $J(\theta^\mu)$ of the policy, gradient ascent can be used to update the parameters $\theta^\mu$ if the gradient of $J(\theta^\mu)$ is known:

$$\theta^\mu \leftarrow \theta^\mu + \eta \nabla_{\theta^\mu} J(\theta^\mu) \tag{39}$$

where η is the learning rate.

The policy gradient $\nabla_{\theta^\mu} J(\theta^\mu)$ can be estimated from K sampled transition pairs $(s_i, a_i, r_i, s_{i+1})$ as:

$$\nabla_{\theta^\mu} J \approx 1/K \Sigma_{t=1}^K \nabla_a Q_{\pi_{\theta^\mu}}(s_i, a | \theta^Q)|_{a=\mu(s_i)} \nabla_{\theta^\mu} \mu(s_i | \theta^\mu) \tag{40}$$

where $Q_{\pi_{\theta^\mu}}(s, a | \theta^Q)$ is called action-value function, which is defined as:

$$Q_{\pi_{\theta^\mu}}(s, a | \theta^Q) = E_{\pi_{\theta^\mu}}[G_t | s_t = s, a_t = a] \tag{41}$$

The action-value function represents the expected discounted cumulated reward $G_t$ that can be received by taking action a at state s and then following policy $\pi_{\theta^\mu}$. It is represented by a neural network Q parametrized by $\theta^Q$. In the literature, the policy network $\mu(s_t | \theta^\mu)$ is referred to as the actor as it determines what action to take directly. The Q-network $Q_{\pi_{\theta^\mu}}(s, a | \theta^Q)$ is called critic as it guides how the actor is updated.

Figure 9:
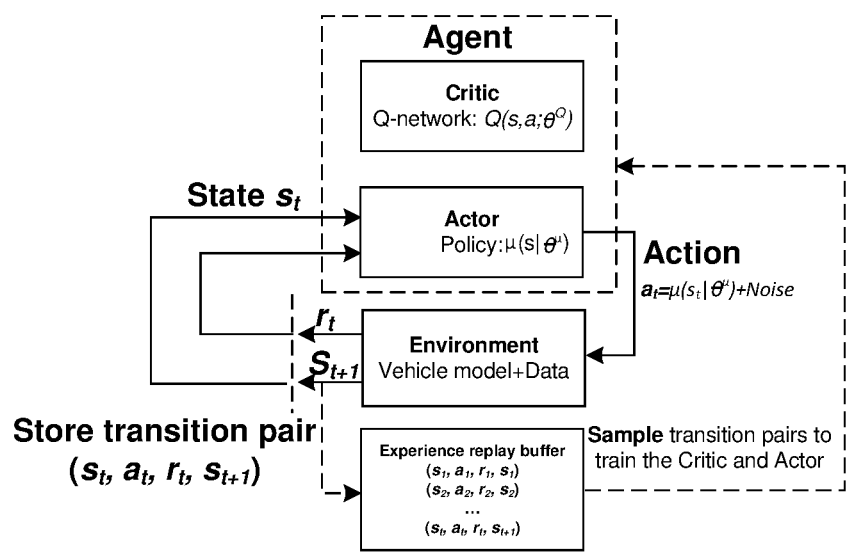
FIG. 9 provides a flow diagram of the update process of a single time step in the while loop of FIG. 8.

FIG. 8 provides a flow diagram of a method of training the actor and critic neural networks in accordance with one embodiment. The update process of a single time step in the while loop is illustrated in FIG. 9.

Experience replay and target network with soft update is used to stabilize the training process. Experience replay is used to break the correlations of transition pairs used to update the actor and critic. The target network is used to provide a more stable target for the update. A Gaussian exploration noise is added to the action during training to keep the algorithm exploring the goodness of different actions under different states.

In accordance with one embodiment, both the critic and actor are feedforward neural networks with two hidden layers and one output unit (64 units in the first layer and 48 units in the second layer). The activation function used in hidden layers is called Rectified Linear Unit which has the form of $f(x)=\max(0, x)$. There is no activation function for the output unit of critic. Hyperbolic tangent function (tan h) is used in the output unit of actor to bound the output with range (−1, +1). Adam optimizer is used for the learning of parameters in the two neural networks with a learning rate of $10^{-4}$ and $10^{-3}$ for the actor and critic respectively. The neural networks are trained on 52 historical delivery trips with a distance range of 39 to 56 miles for 800 epochs (M=800 and N=52 in the method shown in FIG. 8).

Figures 10A, 10B:
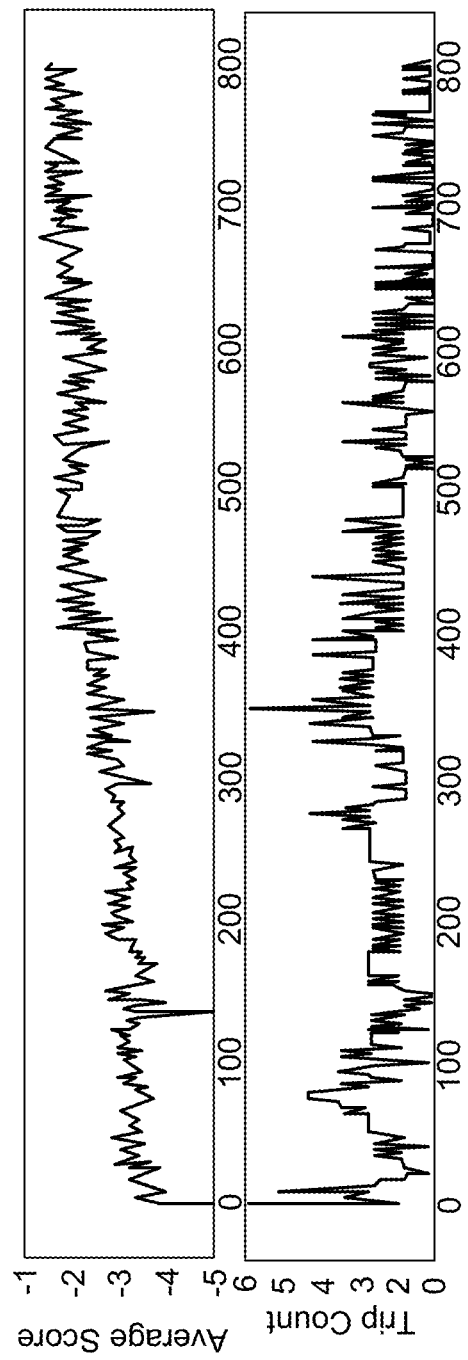
FIG. 10A provides a graph 1000 showing the total discounted reward for epochs as training progressed.
FIG. 10B shows a graph indicating the number of trips during which the SOC dropped below 10% during training.

FIG. 10A shows a graph 1000 showing the total discounted reward for epochs as training progressed. FIG. 10B shows a graph 1002 indicating the number of trips during which the SOC dropped below 10% during training as training progressed. As shown in graphs 1000 and 1002, the neural network improved its total discounted reward while decreasing the number of times the SOC dropped below 10% through the training. The final parameters of the actor neural network were taken from epoch 792. The average score achieved on all training trips was −1.39 without any trips having a SOC value lower than 10%.

Testing

Figure 11:
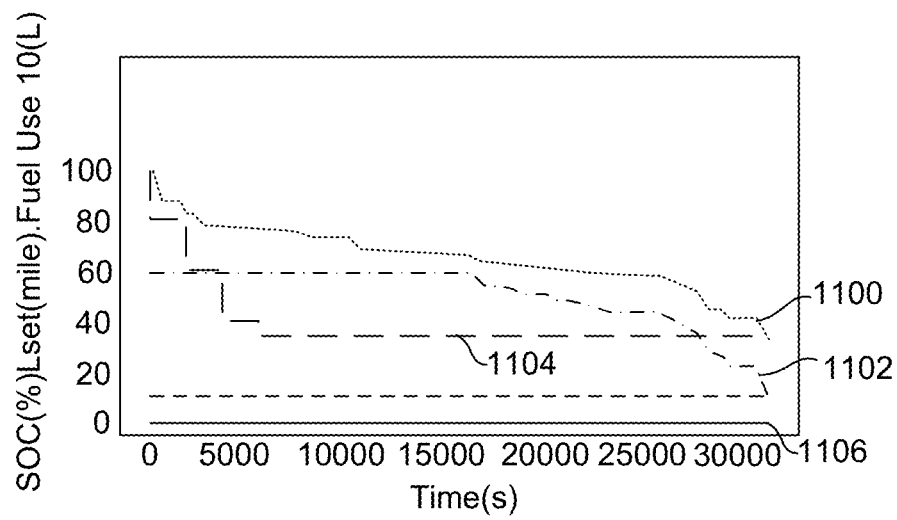
FIG. 11 shows graphs of the state of charge, state of charge reference, $\varphi$, and amount of additional electrical energy for a first test trip using a trained neural network.
Figure 12:
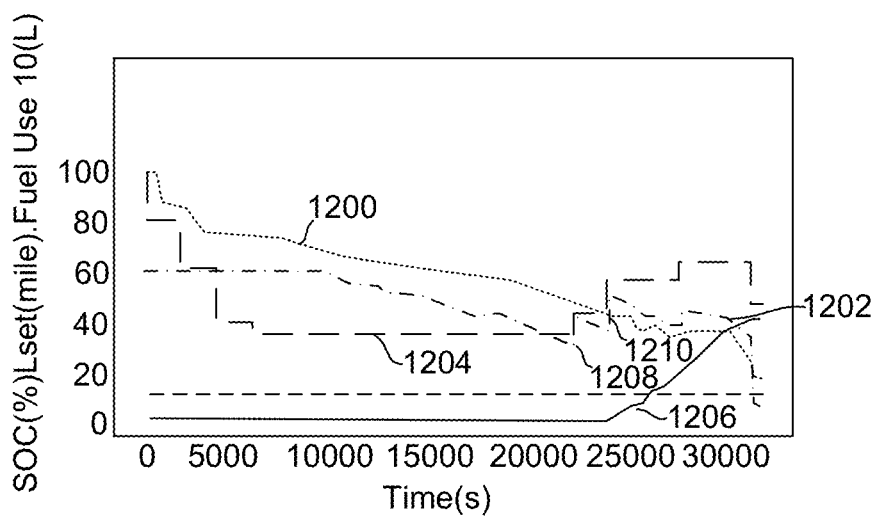
FIG. 12 shows graphs of the state of charge, state of charge reference, $\varphi$, and amount of additional electrical energy for a second test trip using a trained neural network.

To evaluate the performance of the trained DDPG solution, it was tested on 51 delivery trips. The distance range of the test trips was from 31 to 54 miles. FIG. 11 shows graphs of the state of charge 1100, state of charge reference 1102, $\varphi$ 1104, and amount of additional electrical energy 1106 for a first test trip and FIG. 12 shows graphs of the state of charge 1200, state of charge reference 1202, $\varphi$ 1204, and amount of additional electrical energy 1206 for a second test trip. In both FIG. 11 and FIG. 12, it can be seen that $\varphi$, and thus the $SOC_{ref}$ function, are being changed during the trip. Thus, the way in which the $SOC_{ref}$ is being calculated is changed during each trip. For the shorter trip of FIG. 11, the vehicle did not use any additional electrical energy during the trip, achieving the highest efficiency. For the longer trip of FIG. 12, $\varphi$ was increased twice at the final leg of the trip (shown by vertical jumps 1208 and 1210 in $SOC_{ref}$) and prevented the SOC from dropping lower than 10% while not using too much additional electrical energy.

Figure 13:
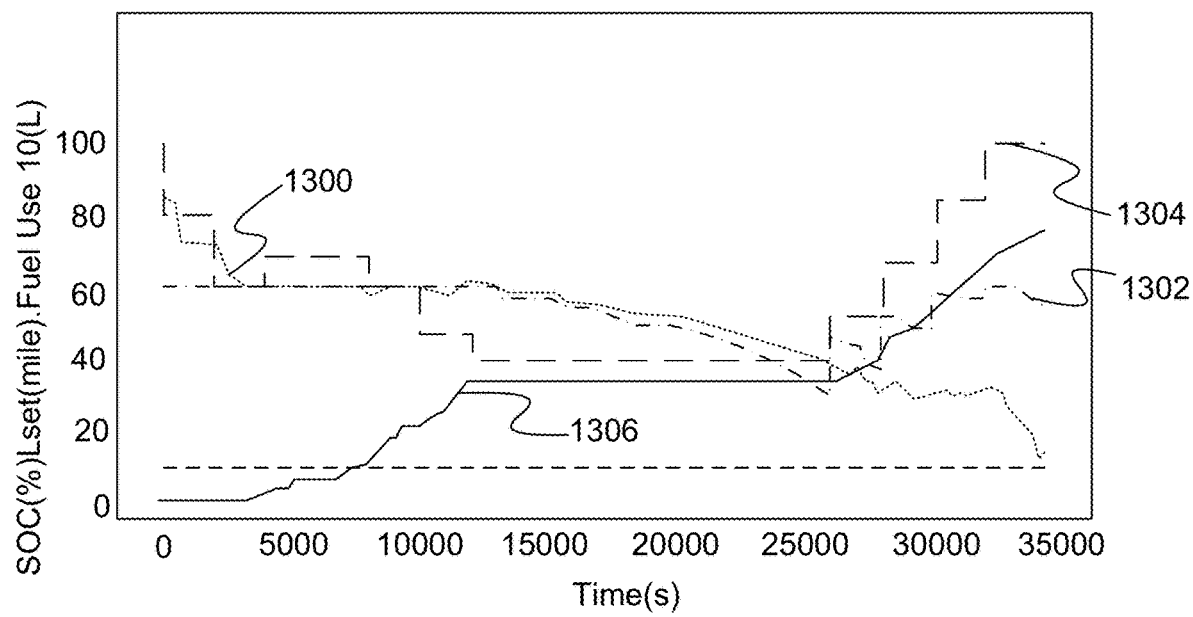
FIG. 13 shows graphs of the state of charge, state of charge reference, $\varphi$, and amount of additional electrical energy for a third test trip in which the initial state of charge was 85%.
Figure 14:
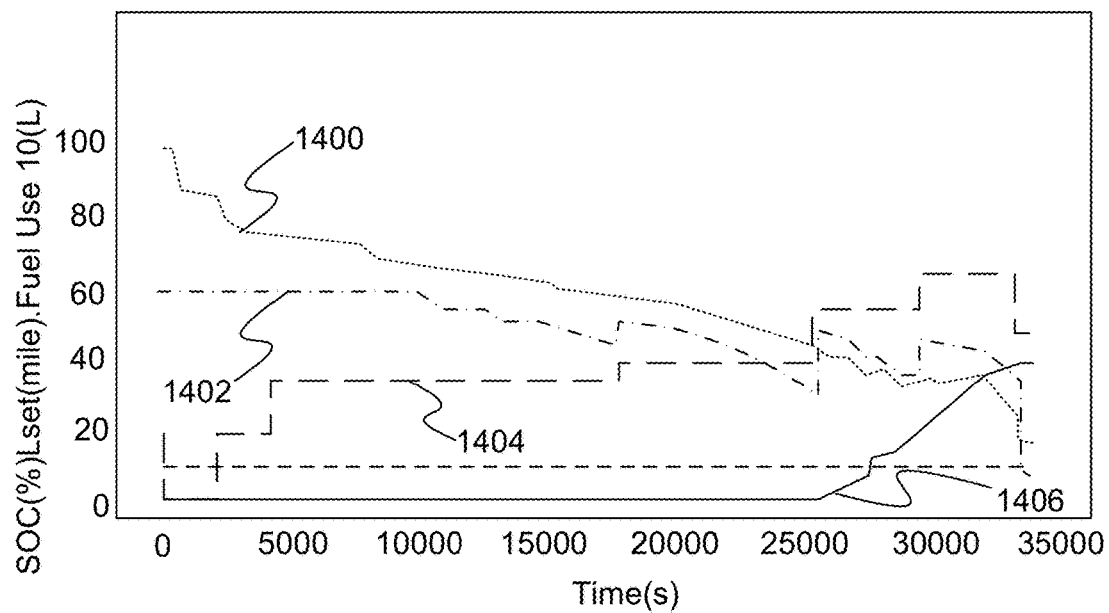
FIG. 14 shows graphs of the state of charge, state of charge reference, $\varphi$, and amount of additional electrical energy for a fourth test trip in which the initial value of $\varphi$ is different from the initial value used during training.

The resulting neural network is robost and can handle conditions that were not seen during training. For example, the trips in the training data all began with 100% state of charge. However, the neural network is able to handle a lower initial state of charge as shown in FIG. 13, which provides graphs of the state of charge 1300, state of charge reference 1302, $\varphi$ 1304, and amount of additional electrical energy 1306 for a test trip in which the initial state of charge was 85%. As shown in FIG. 13, the neural network calls for additional electrical energy early to make up for the lower initial state of charge and thereby prevents the state of charge from dropping below 10%. The neural network is also able to handle different starting values for $\varphi$ as shown in FIG. 14. FIG. 14 provides graphs of the state of charge 1400, state of charge reference 1402, $\varphi$ 1404, and amount of additional electrical energy 1406 for a test trip in which the initial value of $\varphi$ is different from the initial value used during training of the neural network.

Figure 15:
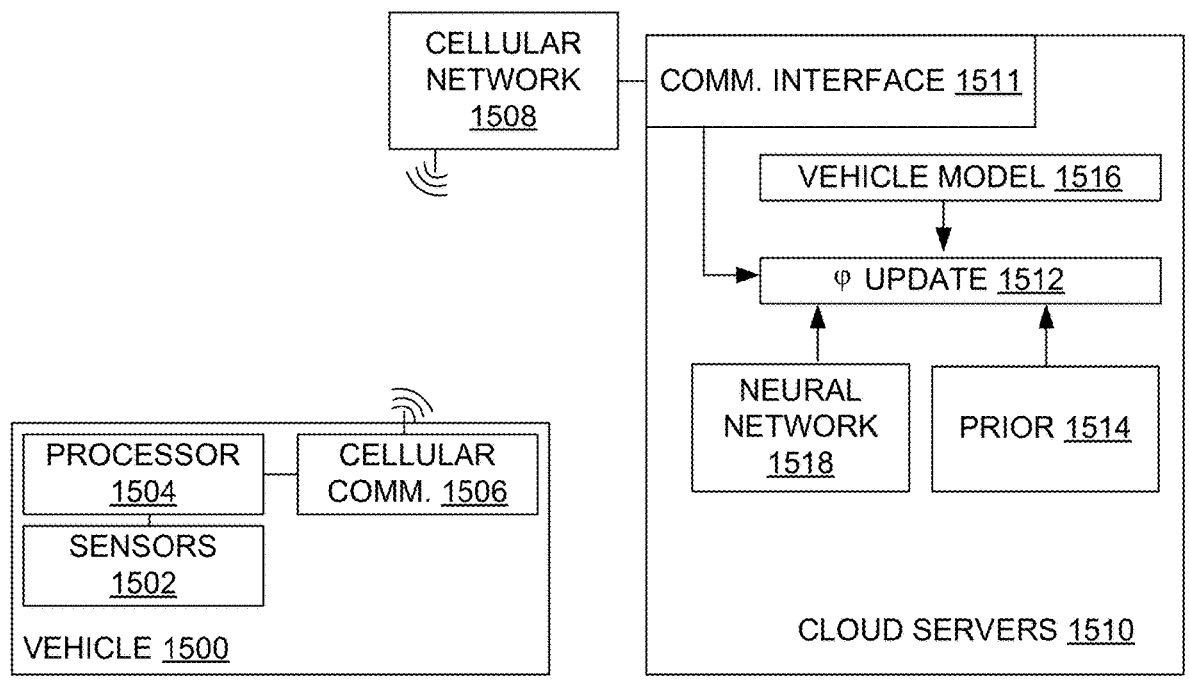
FIG. 15 provides a block diagram of a system in accordance with one embodiment.

The two embodiments described above can be implemented in a system such as the system shown in FIG. 15. In FIG. 15, a processor 1504 in vehicle 1500 receives a collection of sensor values such as current GPS location, velocity, acceleration, braking, state of charge, generator output, and fuel consumption from a collection of sensors 1502 at periodic intervals such as every 2 seconds. Processor 1504 transmits this information through a cellular communication module 1506 and a cellular network 1508 to a communication interface 1511 on one or more cloud servers 1510. For the Bayesian embodiments, such communication can occur in real time or in batch processes, such as while the vehicle is plugged in for recharging. For the reinforcement learning embodiments, the communication occurs in real time. Cloud servers 1510 include one or more processors that execute a $\varphi$ update 1512. For the Bayesian embodiments, $\varphi$ update 1512 uses prior model 1514, vehicle model 1516 and the sensor values provided by the communication interface 1511 from vehicle 1500 to update the prior model and to estimate $\varphi$ for the next trip. For the reinforcement learning embodiments, $\varphi$ update 1512 uses neural network 1518 and the current state of vehicle 1500 provided by communication interface 1511 to select an action that alters $\varphi$. After $\varphi$ has been changed using either the Bayesian embodiment or the reinforcement learning embodiment, the altered value of $\varphi$ is returned to processor 1504 on vehicle 1500.

Processor 1504 uses the value of $\varphi$ returned by cloud servers 1510 to calculate $SOC_{ref}$ and then compares the current state of charge to $SOC_{ref}$. When the current state of charge is less than $SOC_{ref}$, processor 1504 issues an instruction to provide additional electrical energy to the battery either by instructing the internal combustion engine to start or by sending a notification to recharge the battery using an external charger.

While the embodiments above are discussed in connection with delivery vehicles, the embodiments are applicable to other types of vehicles including commuter vehicles, personal vehicles that follow similar routes on different days, waste disposal vehicles, and police vehicles, for example. In addition, although the embodiments have been described with reference to range extended hybrid electric vehicles, the embodiments can also be applied to multi-mode pure electric vehicles where the vehicle enters different powertrain operation modes that consumes less charge (limited acceleration and/or speed) in order to stay above the SOC reference or that limit power used by heating/air conditioning units and internal power outlets, for example. The embodiments can also be used in a parallel hybrid vehicle where the combustion engine is used to drive the powertrain so that the SOC is held constant and above the SOC reference. When the SOC reference is sufficiently below the SOC, the electric motor is engaged and the combustion engine is turned off.

Figure 16:
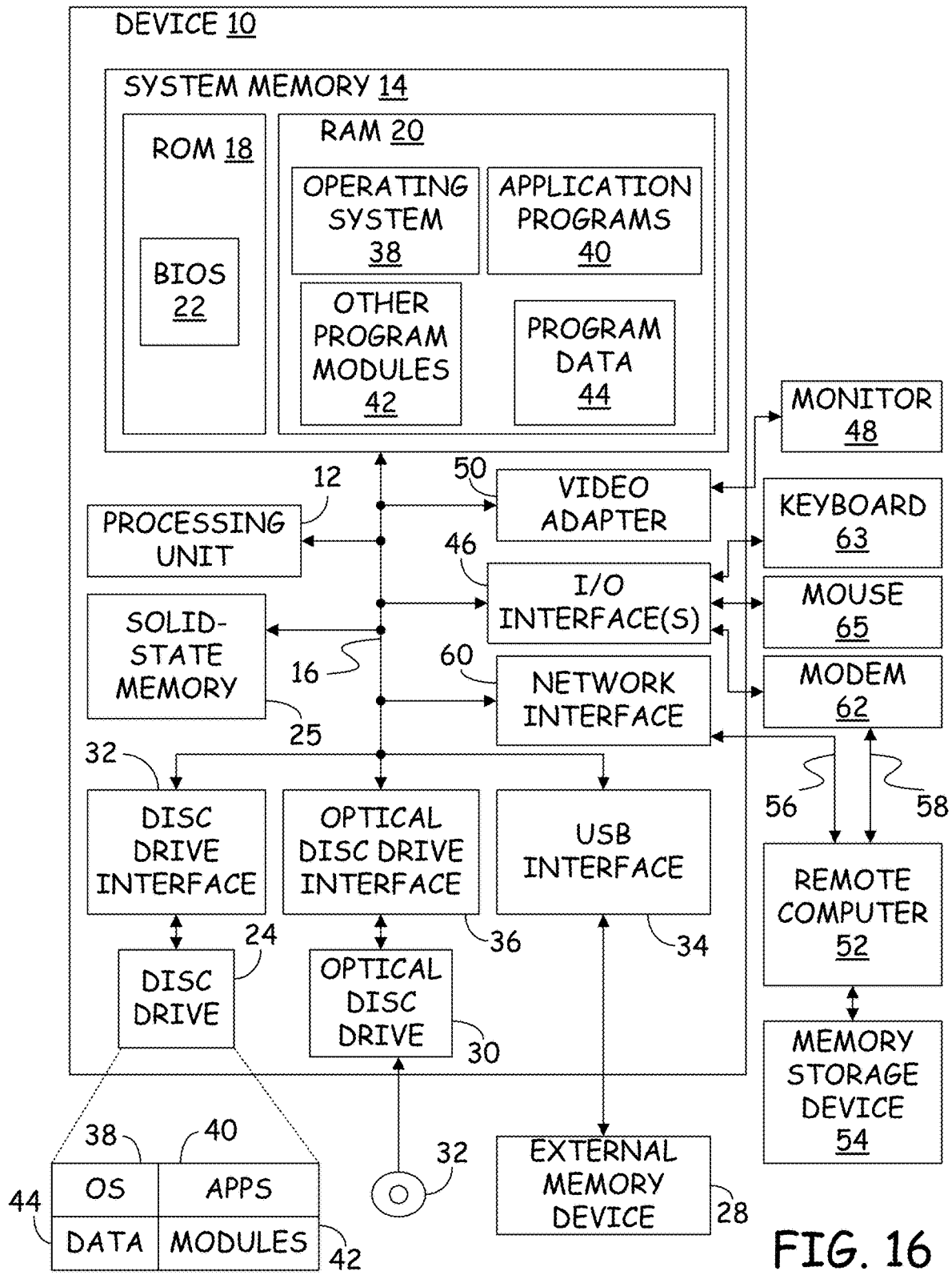
FIG. 16 provides a block diagram of a computing system.

FIG. 16 provides an example of a computing device 10 that can be used as a server or client device in in the embodiments above. Computing device 10 includes a processing unit 12, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the computing device 10, is stored in ROM 18. Computer-executable instructions that are to be executed by processing unit 12 may be stored in random access memory 20 before being executed.

Embodiments of the present invention can be applied in the context of computer systems other than computing device 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computing device 10 further includes an optional hard disc drive 24, an optional external memory device 28, and an optional optical disc drive 30. External memory device 28 can include an external disc drive or solid state memory that may be attached to computing device 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives and external memory devices and their associated computer-readable media provide nonvolatile storage media for the computing device 10 on which computer-executable instructions and computer-readable data structures may be stored. Other types of media that are readable by a computer may also be used in the exemplary operation environment.

A number of program modules may be stored in the drives and RAM 20, including an operating system 38, one or more application programs 40, other program modules 42 and program data 44. In particular, application programs 40 can include programs for implementing any one of modules discussed above. Program data 44 may include any data used by the systems and methods discussed above.

Processing unit 12, also referred to as a processor, executes programs in system memory 14 and solid state memory 25 to perform the methods described above.

Input devices including a keyboard 63 and a mouse 65 are optionally connected to system bus 16 through an Input/Output interface 46 that is coupled to system bus 16. Monitor or display 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

The computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 16. The network connections depicted in FIG. 16 include a local area network (LAN) 56 and a wide area network (WAN) 58. Such network environments are commonplace in the art.

The computing device 10 is connected to the LAN 56 through a network interface 60. The computing device 10 is also connected to WAN 58 and includes a modem 62 for establishing communications over the WAN 58. The modem 62, which may be internal or external, is connected to the system bus 16 via the I/O interface 46.

In a networked environment, program modules depicted relative to the computing device 10, or portions thereof, may be stored in the remote memory storage device 54. For example, application programs may be stored utilizing memory storage device 54. In addition, data associated with an application program may illustratively be stored within memory storage device 54. It will be appreciated that the network connections shown in FIG. 16 are exemplary and other means for establishing a communications link between the computers, such as a wireless interface communications link, may be used.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A method of increasing an amount of electrical energy available to a vehicle, the method comprising:
    setting at least one parameter for a function describing a reference state of charge as a function of distance traveled, wherein the reference state of charge represents a state of charge of the vehicle at which the amount of electrical energy available to the vehicle should be increased, wherein setting the at least one parameter causes different trips of a same vehicle to use different functions for the reference state of charge; and
    during a trip:
        using the at least one parameter set for the function and a distance traveled during the trip to determine a value for the reference state of charge; and
        determining that a current state of charge of the vehicle is equal to or less than the reference state of charge and, in response, instructing an internal combustion engine to start or sending a notification to recharge the vehicle using an external charger.

2. The method of claim 1, wherein the setting the at least one parameter comprises setting the at least one parameter before a trip to form at least one modified parameter and using the at least one modified parameter for an entirety of the trip.

3. The method of claim 2, wherein the setting the at least one parameter before starting a trip comprises setting the at least one parameter based on a prior model created at least in part from past trips of the same vehicle.

4. The method of claim 3, wherein the prior model is created at least in part from a respective best value for each of the at least one parameter determined for a most recent past trip of the same vehicle, wherein the respective best value for each of the at least one parameter results in the least amount of electrical energy being made available to the vehicle while preventing the state of charge from crossing below a threshold during the most recent past trip.

5. The method of claim 4, wherein the best value is determined using a vehicle model to estimate changes in the state of charge for the most recent past trip.

6. The method of claim 1, wherein the setting the at least one parameter comprises modifying the at least one parameter during the trip.

7. The method of claim 6, wherein the setting the at least one parameter comprises using a neural network to select a change in the at least one parameter based on a state of the vehicle.

8. The method of claim 7, wherein the neural network is trained using reinforcement learning.

9. The method of claim 1, wherein the vehicle is a range extended hybrid electric vehicle.

10. The method of claim 9, wherein the vehicle is an all-electric vehicle.

11. A computer system comprising:
a communication interface receiving trip information from a vehicle for a time period;
a processor, receiving the trip information from the communication interface and performing steps comprising:
using the trip information for the time period to change how a reference state of charge is determined from a distance traveled during a trip, wherein the reference state of charge represents a state of charge of the vehicle at which an amount of electrical energy available to the vehicle should be increased; and
providing to a processor in a vehicle an indication of how the reference state of charge is to be determined from the distance traveled so as to cause the processor to:
determine the reference state of charge from the distance traveled during the trip; and
determine that a current state of charge of the vehicle is equal to or less than the reference state of charge and, in response, instructing an internal combustion engine to start or sending a notification to recharge the vehicle using an external charger.

12. The computer system of claim 11, wherein the time period covers the entirety of a previous trip.

13. The computer system of claim 12, wherein changing how the reference state of charge is determined comprises changing how the reference state of charge is determined based on a prior model of a parameter used to determine the reference state of charge.

14. The computer system of claim 13, wherein the prior model is created at least in part from a best value for the parameter determined for a most recent past trip of the vehicle, wherein the best value results in the least amount of electrical energy being made available to the vehicle while preventing the state of charge from crossing below a threshold during the most recent past trip.

15. The computer system of claim 14, wherein the best value is determined using a vehicle model to estimate changes in the state of charge for the last trip.

16. The computer system of claim 11, wherein the time period covers less than all of a trip in progress.

17. The computer system of claim 16, wherein using the trip information for the time period to change how the reference state of charge is determined comprises using the trip information to identify a state and applying the state to a neural network to obtain the change in how the reference state of charge is determined.

18. A computing device comprising:
a memory storing trip information for a vehicle;
a processor executing instructions to perform steps comprising:
using at least some of the trip information to alter a function used to determine a reference state of charge from a distance traveled during a trip, wherein the reference state of charge represents a state of charge of the vehicle at which an amount of electrical energy available to the vehicle should be increased and wherein the reference state of charge changes during a vehicle trip;
using the altered function to determine the reference state of charge from the distance traveled;
determining that a current state of charge of the vehicle is equal to or less than the reference state of charge and, in response, instructing an internal combustion engine to start or sending a notification to recharge the vehicle using an external charger.

19. The computing device of claim 18, wherein the trip information used to alter the function comprises trip information for an entirety of a latest trip.

20. The computing device of claim 19, wherein the trip information is used to alter a prior probability distribution and the prior probability distribution is used to alter the function.

21. The computing device of claim 18, wherein the trip information comprises trip information for a current trip.

22. The computing device of claim 21, wherein altering the function comprises determining a state from the trip information and applying the state to a neural network to determine how to alter the function.

* * * * *